Dec. 9, 1952      W. PALMER      2,621,238
PHASE SHIFT TIMER
Filed March 4, 1947
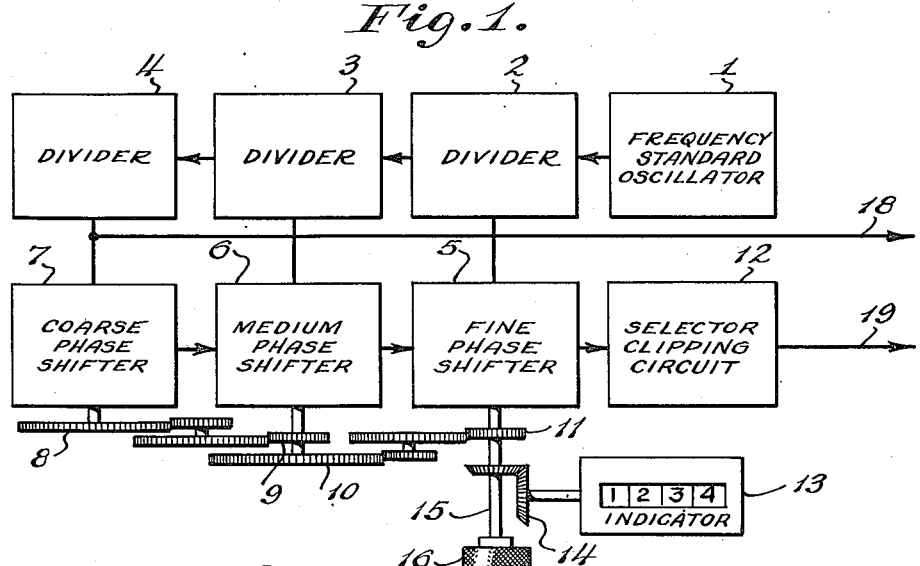
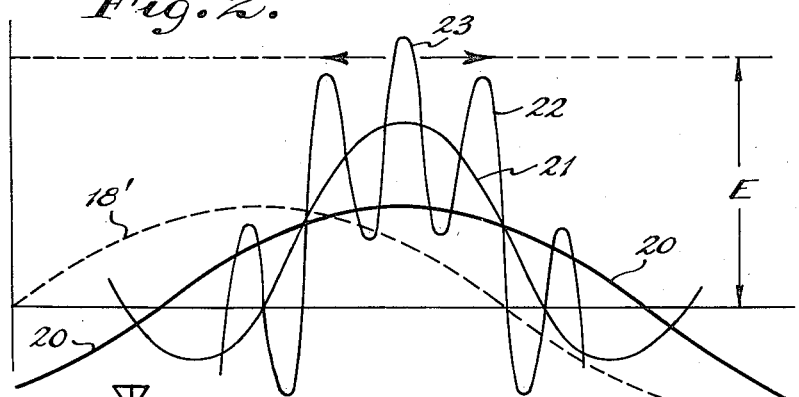
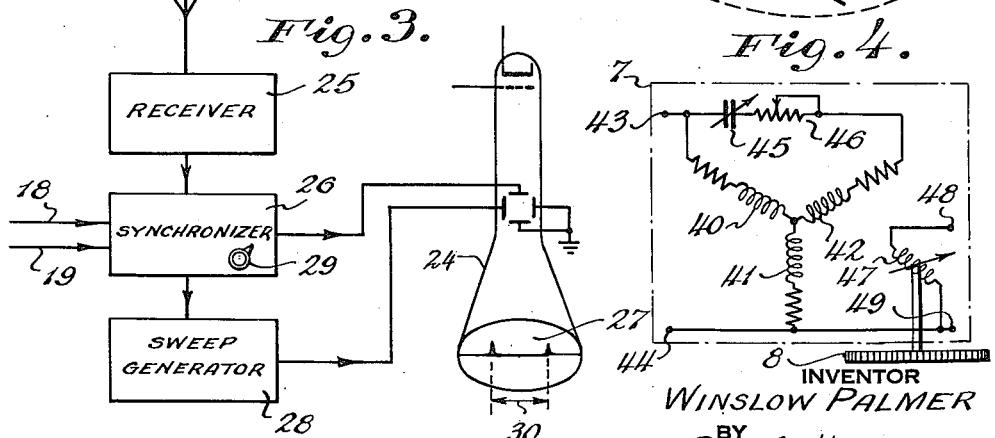
INVENTOR
WINSLOW PALMER
BY
Paul B. Hunter
ATTORNEY Patented Dec. 9, 1952

2,621,238

UNITED STATES PATENT OFFICE 2,621,238

PHASE SHIFT TIMER

Winslow Palmer, West Hempstead, N. Y., assignor to The Sperry Corporation, a corporation of Delaware Application March 4, 1947, Serial No. 732,243

9 Claims. (Cl. 175—381)

The present invention relates to timing systems and more particularly to phase shifting methods and apparatus for use with periodic interval timing systems.

Direct reading timing devices to measure very small recurrent intervals with extreme accuracy are of great general utility and are of particular importance in radar and loran navigation apparatus. For instance, in a loran receiver two pulse signals are periodically received which are separated by an interval measured in micro-seconds which must be determined very accurately.

One type of which a timing system is disclosed in my co-pending application Serial No. 633,473, filed December 7, 1945, which employs a series of selective gating circuits arranged to generate a periodic pulse having a definite time delay relative to a reference point in the cycle.

The present invention is directed to a new and improved method of obtaining an accurately delayed periodic timing wave, which eliminates the series of gating circuits shown in the above-mentioned application, and produces the delayed pulse in a single selector circuit.

Accordingly, a principal object of the invention is to provide a novel and improved apparatus for delaying a recurring signal, a definite time.

Another object of the present invention is to provide new and improved apparatus for accurately measuring a periodically recurring time interval.

Another object of the invention is to provide phase shifting means adapted to delay a reference signal a definite indicated time.

Still another object of the invention is to provide means to synthesize a timing signal from several related sine wave frequencies and means to delay said pulse by phase shifting said separate frequencies.

These and other objections of the invention will be apparent from the following specification and figures of which:

Fig. 1 is a block diagram of an embodiment of the invention;

Fig. 2 is a graph of a group of wave forms illustrative of the invention;

Fig. 3 is a block diagram of a radio system utilizing the invention;

Fig. 4 is a schematic diagram of the phase shifter adapted for use in the invention.

Fig. 1 discloses an embodiment of the invention comprising an oscillator 1 used as a frequency standard and a plurality of frequency dividers 2, 3 and 4 connected in series with said frequency standard oscillator 1. The lowest frequency output on lead 18 from the divider chain is chosen equal to the recurrence frequency of the interval to be measured.

Phase shifters 5, 6 and 7 are each connected to one of the frequency dividers 2, 3 and 4, respectively. The phase shifters may be of the rotary transformer type and they have their rotor shafts geared together by gears 8, 9, 10 and 11, the gear ratios being proportional to their frequencies. For instance, if the ratio of the highest to the next frequency is 10:1, the gear ratio between the respective phase shifters is chosen as 10:1 and it requires a phase shift of 10 cycles or 3600° of the fine phase shifter 5, to rotate the medium phase shifter 6 through one cycle of 360°. The rotor outputs of the phase shifters 5, 6 and 7 are connected in series and applied to the input of a selector circuit 12.

The indicator 13 is mechanically connected by bevel gears 14 to the shaft 15 which rotates the phase shifters through the gear train. The embodiment illustrated shows the phase shifters arranged to be rotated manually by turning knob 16 mounted on shaft 15, but the system is not limited to manual operation and may be adapted to be automatically motor driven. The indicator 13 is a mechanical counting indicator of the Veeder type. It is arranged to count the number of rotations of the rotors of the phase shifters 5, 6 and 7 and since the phase shifters are calibrated to measure time, the delay time will be visually indicated on the indicator 13, in convenient time units such as micro-seconds.

The operation of the circuit of Fig. 1 will be explained with reference to Fig. 2 which shows four wave forms 18', 20, 21 and 22 which are harmonically related. The low frequency dotted phase reference wave form 18' appearing on lead 18 is the input, and its phase shifted counterpart is the output of coarse phase shifter 7. The medium frequency wave form 21 may be considered the output of medium phase shifter 6 and the highest frequency wave form 22 may be considered the output of fine phase shifter 5. The phase shifter gearing is zero set so that when the knob 16 is rotated to a definite zero or reference point, the maximum amplitudes of each wave form 18', 20, 21 and 22 will be in phase.

The result desired is to derive or synthesize a timing signal from the superimposed wave forms which may be accurately delayed. This timing signal 23 may be selected from the superimposed wave forms by applying them to a peak responsive selector circuit 12 having a bias equal to voltage E, which circuit will reject all the wave forms of lower amplitude and retain only the desired reference signal 23.

This timing signal 23 may be delayed relative to reference wave 18' on lead 18 by any amount within the period of the lowest frequency by rotating knob 16 and thereby rotating the phase shifters. The timing accuracy of this interval will be that inherent in the highest frequency used. The lower frequency phase shifters 6 and 7 merely keep track of the number of revolutions through which a highest frequency phase shifter has been rotated and serve to extend its range of measurement greater than 360°. The delay introduced will be automatically and visually indicated by indicator 13.

In practical use, for instance, in present day loran equipment, wherein two recurring signals are projected on a cathode ray indicator, the reference wave on lead 18 may be also projected on the cathode ray screen, and synchronized with the first loran signal. The wave 23 on lead 19 is then phase shifted by means of the invention to coincide with the second signal thereby providing a directly indicated measurement of the interval between the signals on indicator 13.

The timing pulse signal 23 may be used directly or it may be used as a trigger to fire a gating, sweep or other circuit. The invention may be utilized wherever it is necessary to measure a recurring time interval accurately. However, the invention is not limited to the measurement of existing intervals but may be used in limitless applications to introduce accurate adjustable delays into a circuit.

Fig. 3 illustrates how the invention may be used in combination with a cathode ray indicator 24 to measure a recurring interval received, for instance, by radio receiver 25. The signals received by receiver 25 are applied through synchronizer 26 to the vertical plates of the cathode ray indicator 24 producing two signals on the cathode ray tube screen 27, as illustrated. The timing signal 23 obtained according to the teaching of the invention is applied to synchronizer 26 on lead 19 which is the output lead of selector 12 of Fig. 1, thus connecting this figure with Fig. 1. The reference wave 18' on lead 18 is also applied through synchronizer 26 to the cathode ray indicator 24. The function of synchronizer 26 is to adjustably synchronize the reference wave 18' with the sweep generator 28 by means of control 29.

The measurement of the interval 30 is obtained by setting knob 16 to its zero reference point and synchronizing the reference signal 18' with the first or left hand signal appearing on the cathode ray screen 27 by means of control 29 of synchronizer 26. The knob 16 is then rotated until the timing signal 23 is superimposed on the other or right hand signal appearing on the cathode ray screen 27 and the interval 30 is then directly read on the calibrated indicator 13. The timing signal 23 may appear on the cathode ray indicator directly or in some cases it may be convenient to use the timing signal 23 to trigger a pedestal voltage which appears on the screen.

Fig. 4 illustrates one embodiment of the phase shifters of Fig. 1. Each phase shifter comprises a phase-splitting network and a phase-shifting transformer. The phase-shifting transformer may be a conventional three-phase synchro control transformer, and the phase-splitting network is provided to change the single phase frequency divider output to three phase at the transformer input.

The stator of the phase-shifting transformer comprises three coils 40, 41 and 42 arranged in a standard Y connection. The resistors in series with the coils represent the coil resistances. The phase-splitting circuit, comprising adjustable condenser 45 and adjustable resistor 46, is connected across stator arms 40 and 42. The values of condenser 45 and resistor 46 are chosen so as to provide balanced three-phase voltages across the three stator arms when a single phase voltage is applied to the input terminals 43 and 44.

The rotor 47 is adapted to be turned as desired to thereby produce a phase-shifted voltage across the output terminals 48 and 49. The rotors of the phase-shift transformers of phase shifters 5, 6 and 7 may be connected in series to provide the combined wave form of Fig. 2. For operation at high frequencies it may be preferable to use a capacitor type phase shifter rather than the transformer type.

Thus it is seen that the present invention provides a novel arrangement comprising apparatus for generating a series of harmonically related frequencies, by a frequency dividing chain, phase shifting the separate frequencies, and superimposing the separate frequencies on each other in such a manner that the peak signal voltage of the combined wave forms may be used as a timing signal. The peak reference signal may be selected from the others by a peak responsive device such as a clipping circuit biased to reject the lower amplitude signals. A separate phase shifter is provided for each frequency and the phase shifters are mechanically geared together proportionally to their frequencies. The rotations of the phase shifters are counted on an indicating counter through a suitable gearing arrangement.

Thus, a single signal is synthesized from the superimposed wave forms of the various frequencies. By rotating the phase shifters, this timing signal may be delayed by any desired interval within the period of the lowest frequency and the timing of this interval will be accurate proportionally to the highest frequency. The lower frequency phase shifters merely keep track of the number of revolutions through which the highest frequency phase shifter which has been rotated and serve only to extend its range of measurement.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. In electronic timing apparatus for measuring periodic intervals, means for generating a plurality of superimposed sine waves, a bias circuit connected thereto for synthesizing a timing signal from said plurality of separate sine wave frequencies, phase shifter means connected to said generating means to delay said timing signal proportionally to said interval, including means to separately shift the phases of said frequencies to thereby measure said interval.

2. In electronic timing apparatus, means for measuring periodic intervals comprising an oscillator for generating a substantially constant reference frequency, means connected to said oscillator for producing a plurality of superimposed sine wave frequencies having definite phase relationships to said reference frequency, bias circuit means connected for obtaining a timing signal at said periodic frequency from said separate frequencies, and means to delay said timing signal proportionally to said interval including phase shifters connected to separately shift the phase of said separate frequencies the outputs of said phase shifters being connected in series.

3. Apparatus for measuring periodic intervals comprising means to generate at least three superimposed waves of different frequency, bias circuit means to obtain a timing signal from said waves, means to separately phase-shift said waves to thereby shift said timing signal a measured amount equal to said periodic interval, and indicating means geared to said phase shifting means to thereby indicate said definite periodic interval.

4. In electronic timing apparatus, means for measuring periodic intervals comprising an oscillator for generating a substantially constant reference sine wave frequency, a chain of frequency dividers connected to said oscillator for producing a plurality of separate superimposed sine waves having definite frequency and phase relationships to said reference frequency, bias circuit means for obtaining a pulse at said periodic frequency from said separate sine wave frequencies, means connected to each of said frequency dividers for shifting the phases of said separate frequencies and means to connect the outputs of said phase shifters in series to thereby delay said pulse a definite measurable time.

5. In electronic timing apparatus, means for generating a substantially constant frequency, means for generating at least three separate frequencies having definite phase relationships to said constant frequency, a plurality of phase shifters each connected to one of said separate frequency generators, said phase shifters being mechanically geared together proportionally to said frequencies and adapted to be rotated to thereby shift the phases of said separate frequencies, means connecting the outputs of said phase shifters in series for superimposing said separate frequencies, selector circuit means connected to said last means to thereby obtain a timing pulse, and means to delay said pulse a definite measurable time by rotation of said phase shifters.

6. Phase shifting apparatus to produce and measure phase shifts greater than 360°, comprising a plurality of separate frequency sine wave generators having a definite frequency relationship, a plurality of phase shifters each connected to one of said separate frequency generators, mechanical gear means connecting said phase shifters together proportionally to said frequencies and adapted to be rotated to thereby shift the phases of said separate frequencies; means connecting the outputs of said phase shifters together to superimpose said separate waves, peak voltage responsive means to obtain a timing signal from said separate frequencies, and means to adjustably delay said timing signal by rotating said phase shifters; means to measure said phase shift delay relative to the phase of the highest of said separate frequencies comprising an indicator counter geared to said phase shifters and responsive to the rotation of said high frequency phase shifter for that portion of the phase shift less than 360° of said high frequency and to the rotation of said lower frequency phase shifters for that portion of the phase shift equal to whole cycle at said high frequency.

7. Electronic timing apparatus for measuring periodic intervals between received radio signals comprising a radio receiver, cathode ray indicating means connected to said receiver to indicate said received periodic signals, means to measure the interval between said received signals comprising means to generate a plurality of separate sine wave frequencies means connecting the outputs of said phase shifters in series to superimpose said frequencies waves, peak voltage responsive means to produce a timing signal from said sine wave frequencies on said cathode ray indicating means at said periodic frequency, means to match said timing signal to said received signals on said cathode ray tube by phase shifting said separate frequencies to thereby delay said timing signal a definite time, and means connected to said phase shifters to automatically indicate the interval between said received signals.

8. Timing apparatus comprising an oscillator, a plurality of frequency dividers connected in series with each other and with said oscillator, a plurality of phase shifters each having their inputs connected to a different one of said frequency dividers, means to connect the outputs of said phase shifters in series to thereby superimpose the sine waves from said phase shifters, and peak responsive bias circuit means connected in series with said phase shifters and adapted to select a timing signal therefrom.

9. Timing apparatus comprising an oscillator, a plurality of frequency dividers connected in series with each other and with said oscillator, a plurality of phase shifters having the input of each connected to one of said frequency dividers, means to connect the outputs of said phase shifters in series to thereby superimpose their output waves, peak responsive bias circuit means connected in series with said phase shifters and adapted to select a timing signal therefrom, means to gear said phase shifters together proportionally to their associated frequencies, and counter indicator means connected to said gear means to indicate the amount of said phase shift.

WINSLOW PALMER.

REFERENCES CITED

The following references are of record in the file of this patent:

UNITED STATES PATENTS

| Number | Name | Date |
| --- | --- | --- |
| 1,667,497 | Shapiro | Apr. 24, 1928 |
| 2,105,870 | Vance | Jan. 18, 1938 |
| 2,405,239 | Seeley | Aug. 6, 1946 |
| 2,407,294 | Shockley et al. | Sept. 10, 1946 |
| 2,416,088 | Deerhake | Feb. 18, 1947 |
| 2,422,204 | Meacham | June 17, 1947 |
| 2,426,216 | Hight | Aug. 26, 1947 |
| 2,427,670 | Goldsmith | Sept. 23, 1947 |
| 2,434,255 | Bond et al. | Jan. 13, 1948 |
| 2,454,810 | Labin | Nov. 30, 1948 |
| 2,471,253 | Toulon | May 24, 1949 |
| 2,475,707 | Jeanne | July 12, 1949 |
| 2,484,034 | Isbister | Oct. 11, 1949 |